Jan. 15, 1935.  S. PETERSON  1,988,018
VALVE CONTROL FOR INTERNAL COMBUSTION ENGINES
Filed Nov. 7, 1932
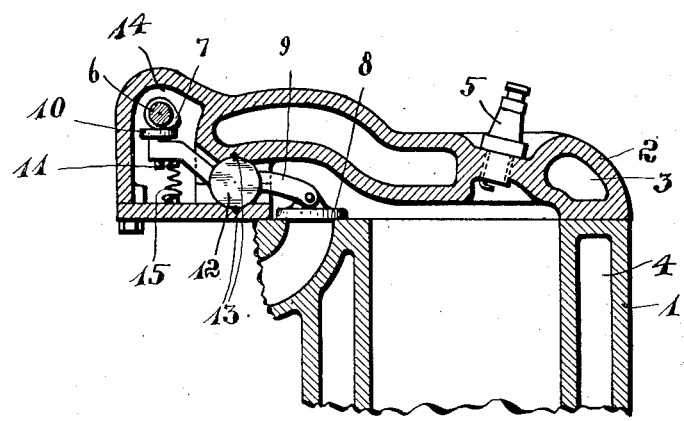
INVENTOR:
SVEN PETERSON, Patented Jan. 15, 1935

1,988,018

UNITED STATES PATENT OFFICE 1,988,018

VALVE CONTROL FOR INTERNAL COMBUSTION ENGINES

Sven Peterson, Los Angeles, Calif.

Application November 7, 1932, Serial No. 641,562

1 Claim. (Cl. 123—90)

This invention relates to devices used in controlling and actuating the inlet and outlet valves of internal combustion engines.

One of the objects of this invention is to eliminate the costs and labor involved in providing and fitting the stems for such valves.

Another object is to eliminate or reduce the costs and labor in maintaining valves of this sort well fitted and seated.

Other objects will appear from the following description and appended claim as well as from the accompanying drawing, in which—

The figure is a fragmentary longitudinal midsectional view through a cylinder-block and a general cross-section through a cooperating portion of a cylinder-head, having valve control means arranged therein according to this invention.

With the modern high-compression internal combustion engines and even with any internal combustion engines, the slightest amount of leakage reduces the efficiency to a considerable degree. The stem of any valve is frequently if not commonly the principal cause of a leakage. If an escape is not directly past the stem or through the bore in which the stem is mounted to move back and forth, any undue friction between the stem and its guiding means in the bore quite often prevents the valve from properly seating and thereby produces the leakage past the valve proper.

By eliminating the valve stem in the manner illustrated in the drawing and at the same time providing a structure by which the cylinder can be sealed off efficiently and effectively easily at all times, there would seem no limit to the compression or to the speed that may be attained under such conditions.

As illustrated, the form or design of the cylinder 1, or of the piston, not shown in the drawing, is disregarded since the cylinder-head 2 may easily be designed to fit any existing cylinder or any specially designed and new cylinder. The general outline, form, or design of the cylinder-head also should be understood not to have to vary materially from the design or form of any existing cylinder-head, as far as customary parts are concerned, such as the water jacket 3 in the head, to be in communication with the water jacket 4 of the cylinder, having also a proper and customary place for a spark plug 5.

A camshaft 6 with an individual cam 7 for each valve control is of a customary design.

However, each valve 8 is directly supported and operative by a lever 9, which in turn is in direct operative contact with the cam 7.

There is no intermediate stem, or intermediate clicking contact.

A removable or replaceable disc 10 with a stem 11 takes care of any wear-off between the cam 7 and the lever, and provides a means whereby the cam may contact at different points in the top surface of the disc, being mounted to rotate by means of the supporting stem 11 so that the cam contacts with the disc at points away from the center. The wear between the cam and the surface of the disc would under such conditions be insignificant, while the wear between the disc and the lever can easily be taken care of by means of washers or an inserted screw-adjustment bushing, not shown in the drawing since they are well known in the art.

The lever 9 is preferably provided with a comparatively large cylindrical pivot support 12, to assure a positive proper alignment of the valve control at all times, this supporting member being turnably mounted in a proper seat within the cylinder head 2.

Though packing means can easily be provided at points indicated at 13 and over the flat ends of the member 12, it will easily be understood that any leakage from the main cylinder into the cam compartment 14 would be of no material consequence.

A suitably strong spring 15 serves to return the valve 8 to seating position.

The showing in the drawing, of having the cam-compartment 14 with the therein disposed parts overhanging one side of the main cylinder, of course, should be understood to have been made only and entirely for the sake of giving a clear illustration of the cooperating parts. Otherwise it must be well enough known that in the majority of cylinder structures, and just as well in this and for this case, the inlet and outlet conduits or passages, commonly to be controlled by valves of the type referred to in this application, are not directly sidewise of the cylinder-bore but rather between adjoining cylinder-bores, or at least practically within the outer side contours of a cylinder-block, which, just naturally, brings all the different parts and the whole cam-compartment 14 more over the top of the engine-block, or, in other words, more over the top of a cylinder.

On the other hand, such or any other variations in the positions of the parts or cam compartment depend entirely on different requirements in different engines and more often on the mere taste or state of mind of different engineers and designers, and I want it understood that I do not limit myself to any particular position of any part with respect to such overhanging and that the valve structure may be disposed at any desired or required place within the scope of this invention.

Having thus described my invention, I claim:—

In an internal combustion engine having a cylinder-block with a finished evenly level top surface, and a removable head with a finished underside in sealing engagement with said surface and provided with a recess serving as a compression chamber; a valve control mounted in said chamber and including a valve, a lever, and a cam-shaft; and valve having a seating means facing outwardly from the head and designed to be in operative seating engagement with said surface, the lever having a central enlarged cylindrical bearing portion besides a valve-lifting means projecting towards one side and actuated means projecting towards the opposite side from the bearing portion, the head having a seat and mounting for said bearing portion thereby partitioning said chamber forming an inactive part in the chamber for said cam-shaft, means on the head providing for an access to said inactive part of the chamber for adjustments of the lever, and means inserted between the cam-shaft and the lever for adjustments of the lever movements, the valve-lifting means of the lever being in pivotal engagement with the valve, and the actuated means of the lever being disposed to act by contact with the cam-shaft.

SVEN PETERSON.